US012082721B2

(12) United States Patent
Kurzdorfer

(10) Patent No.: US 12,082,721 B2
(45) Date of Patent: Sep. 10, 2024

(54) TEMPORARY EXHIBITION STAND BRACKET

(71) Applicant: Daniel Kurzdorfer, Rochester, NY (US)

(72) Inventor: Daniel Kurzdorfer, Rochester, NY (US)

( * ) Notice: Subject to any disclaimer, the term of this patent is extended or adjusted under 35 U.S.C. 154(b) by 0 days.

(21) Appl. No.: 17/880,594

(22) Filed: Aug. 3, 2022

(65) Prior Publication Data

US 2024/0041229 A1 Feb. 8, 2024

(51) Int. Cl.
*A47F 5/10* (2006.01)
*G09F 7/20* (2006.01)

(52) U.S. Cl.
CPC . *A47F 5/10* (2013.01); *G09F 7/20* (2013.01)

(58) Field of Classification Search
CPC .. A47F 5/10; A47F 5/101; A47F 5/103; G09F 7/20
USPC .... 248/558, 125.3, 220.31, 220.41, 221.121, 248/222.41, 124.1, 220.21, 220.42, 235, 248/241; 211/7, 107, 113, 117, 57.1, 211/59.1, 106.01, 207, 54, 1, 190–193, 211/204, 206, 103
See application file for complete search history.

(56) References Cited

U.S. PATENT DOCUMENTS 3,332,197 A * 7/1967 Hinkle .................. E04C 3/06 47/33
3,565,264 A * 2/1971 Guiher ................. A47B 57/402 52/842
3,602,159 A * 8/1971 Marschak ............... A47F 5/103 211/187
3,888,441 A * 6/1975 Rebentisch ............ H02G 3/263 248/73
4,951,827 A * 8/1990 Moransais ................ A47F 5/10 248/220.31
5,174,200 A * 12/1992 Jeandel ................ A47B 57/482 108/193
5,255,803 A * 10/1993 Pavone ..................... A47F 5/00 248/220.21
5,377,851 A * 1/1995 Asano .................. A47B 57/402 211/192
5,769,248 A * 6/1998 Johnson ................ A47F 5/0807 248/220.21
6,015,124 A * 1/2000 Loy ....................... A47F 5/0815 40/607.13
7,076,927 B2 * 7/2006 Trpkovski .............. B65D 19/44 52/204.5
7,083,051 B2 * 8/2006 Smith .................... H04Q 1/064 248/220.42
7,458,744 B2 * 12/2008 Hall ..................... A47B 57/485 403/187

(Continued)

*Primary Examiner* — Christopher Garft
*Assistant Examiner* — Michael McDuffie
(74) *Attorney, Agent, or Firm* — Andrew Morabito

(57) ABSTRACT

A frame display installation assembly comprising: a set of end brackets, wherein the end brackets have a slot on a first side, wherein the slot extends through a portion of the bracket and a securing means on a second side; and a set of upper brackets, wherein the upper brackets have to least of claim 1, wherein the upper bracket has a slot that ends through the bracket on a first side and a securing means on a second side; wherein the set of end brackets and the set of upper frame brackets are secured to a frame and wherein the slots of the set of end brackets and the set of upper frame brackets align.

13 Claims, 4 Drawing Sheets

(56) References Cited

U.S. PATENT DOCUMENTS

| | | | | |
|---|---|---|---|---|
| 7,712,616 | B2 * | 5/2010 | Barkdoll | A47F 5/0807 211/59.1 |
| 7,909,184 | B2 * | 3/2011 | Clark | A47F 5/08 211/85.3 |
| 8,146,755 | B2 * | 4/2012 | Schwartzkopf | A47F 5/0838 211/103 |
| 8,376,156 | B2 * | 2/2013 | Jarvis | A47B 47/045 211/187 |
| 8,631,965 | B2 * | 1/2014 | Leasure | B65D 19/10 220/660 |
| 8,814,108 | B2 * | 8/2014 | Bernstein | A47F 5/0823 211/113 |
| 8,967,402 | B2 * | 3/2015 | Pintur | A47B 47/022 211/DIG. 1 |
| 9,204,738 | B2 * | 12/2015 | Sitton | A47F 5/118 |
| 9,596,948 | B1 * | 3/2017 | McGinnis | A47F 5/103 |
| 10,672,302 | B1 * | 6/2020 | Schultz | A47F 5/0846 |
| 10,939,756 | B2 * | 3/2021 | Peck | A47B 96/024 |
| 11,607,037 | B2 * | 3/2023 | Baez | A47B 47/045 |
| 2012/0018605 | A1 * | 1/2012 | Lacarra | A47B 88/43 211/163 |

* cited by examiner

TEMPORARY EXHIBITION STAND BRACKET

BACKGROUND OF THE INVENTION

The present invention relates to a bracket, and more particularly to a bracket for a modular metal frame structure.

A modular temporary exhibition stand is a temporary building which consists of several walls and can be constructed or dismounted and removed rapidly when needed, wherein the main components have a modular design and are usually frame modules provided with installation holes. A frame module consists in the first place of a number of profiles and frame modules are assembled or disassembled through bolts and end fittings. The frame modules can be assembled flexibly and can be adjusted according to requirements defined in the design of the exhibition stand. After installation, display materials, panels, canvases and suchlike are assembled on the several walls of the exhibition stand in order to obtain the ideal layout.

In some cases, display screens, panels, and other components are incorporated into the frame to improve the aesthetics or to allow additional features to be incorporated into the frame. The components used in the exhibition stand should meet the requirements of a modular design. At present, there is not a good universal solution available in the industry to integrate these components in temporary exhibition stands in a modular manner.

SUMMARY

In a first embodiment, the present invention is a frame display installation assembly comprising: a set of end brackets, wherein the end brackets have a slot on a first side, wherein the slot extends through a portion of the bracket and a securing means on a second side; and a set of upper brackets, wherein the upper brackets have to least of claim 1, wherein the upper bracket has a slot that ends through the bracket on a first side and a securing means on a second side; wherein the set of end brackets and the set of upper frame brackets are secured to a frame and wherein the slots of the set of end brackets and the set of upper frame brackets align.

DETAILED DESCRIPTION OF THE INVENTION

Figure 1:
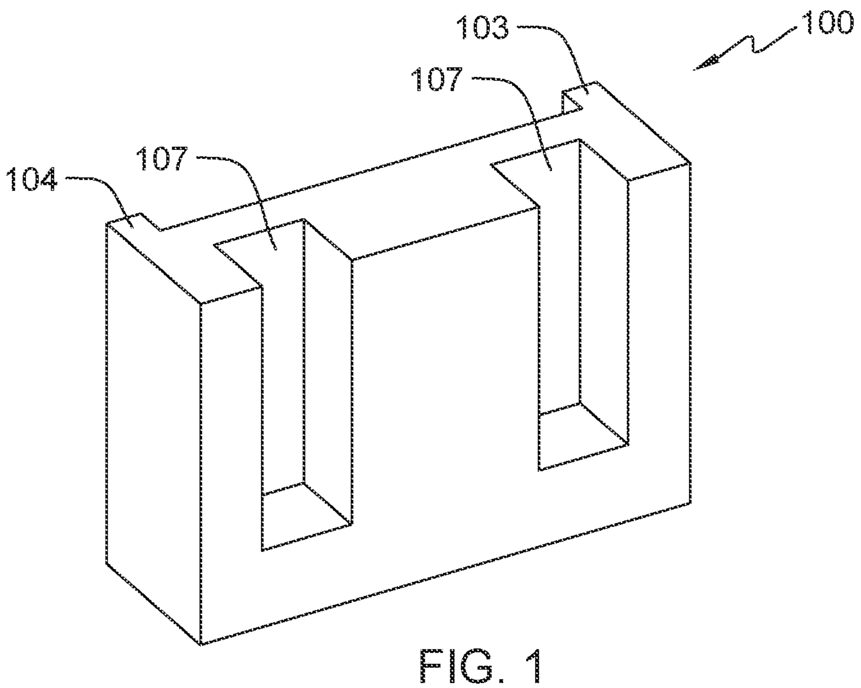
FIG. 1 depicts an isometric view of an end bracket, in accordance with one embodiment of the present invention.

The present invention provides a bracket which is able to work with a variety of modular frames used for exhibitions and the like. The bracket is advantageous because it allows for an easy and straight forward installation process for a panel or component to be incorporated into a variety of frames. The installer can easily install the panels with the brackets regardless of the frame manufacturers design. The brackets are designed for a quick and secure installation of the components through the design of the end brackets and the middle brackets. This speeds up the process of assembly and disassembly, and also allows for quick adjustments to the components as well without much if any disassembly. Through very minor modifications to the bracket, the bracket is able to work with a wide variety of manufactures frames as well.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 2:
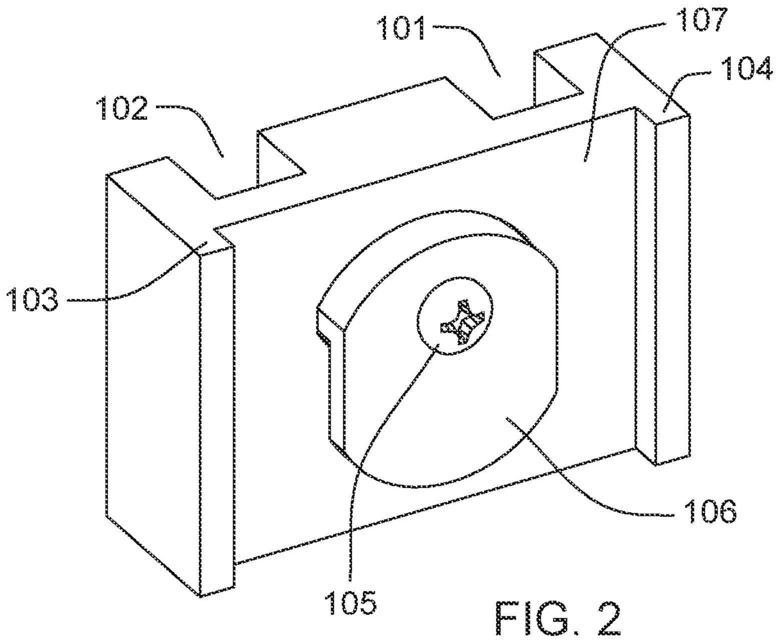
FIG. 2 depicts an isometric view of the end bracket, in accordance with one embodiment of the present invention.
Figure 8:
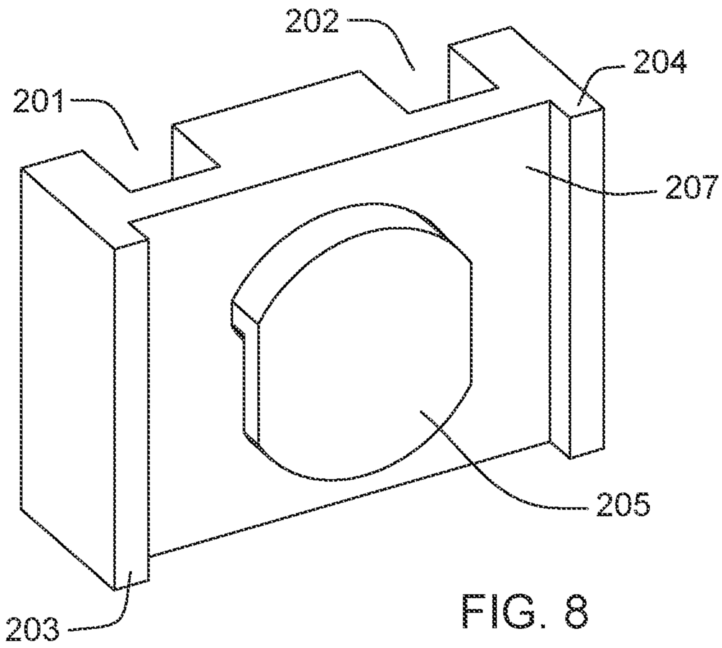
FIG. 8 depicts an isometric view of the upper bracket, in accordance with one embodiment of the present invention.

FIGS. 1 and 2 depicts an isometric view of an end bracket 100, in accordance with one embodiment of the present invention. The end bracket 100 may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like. The end bracket 100 is a solid member with slots 101 and 102 which extend a predetermined distance through the solid member to form two slots that do not extend all the way through the end bracket 100. On an opposing side of the end bracket 100 are two extrusions 103 and 104 which form a surface 107. The extrusions are used to align the end bracket 100 with the frame so that the end bracket 100 is substantially parallel to the frame. This surface is wider than most of the manufacturers frame members to provide for the universal fit of the end bracket 100. Positioned on the surface 107 and between slots 101 and 102 is an opening which is designed to receive a fastener 105. This opening may be threaded, or the like based on the type of fastener 105 used. Locking member 106 is secured to the surface 107 via the fastener 105. The locking member 106 is designed to work with the specific manufacturers frame to secure the end bracket 100 to the frame. Given that various manufactures may use different sized openings or the like to secure items to their frames, the locking member 106 is removable and replaceable to allow for a secure attachment to a variety of frames. As shown in FIG. 8, the locking member is adhered to the bracket. In additional embodiments, the locking member is integrated into the bracket, wherein the locking member and the bracket a single component.

Figure 3:
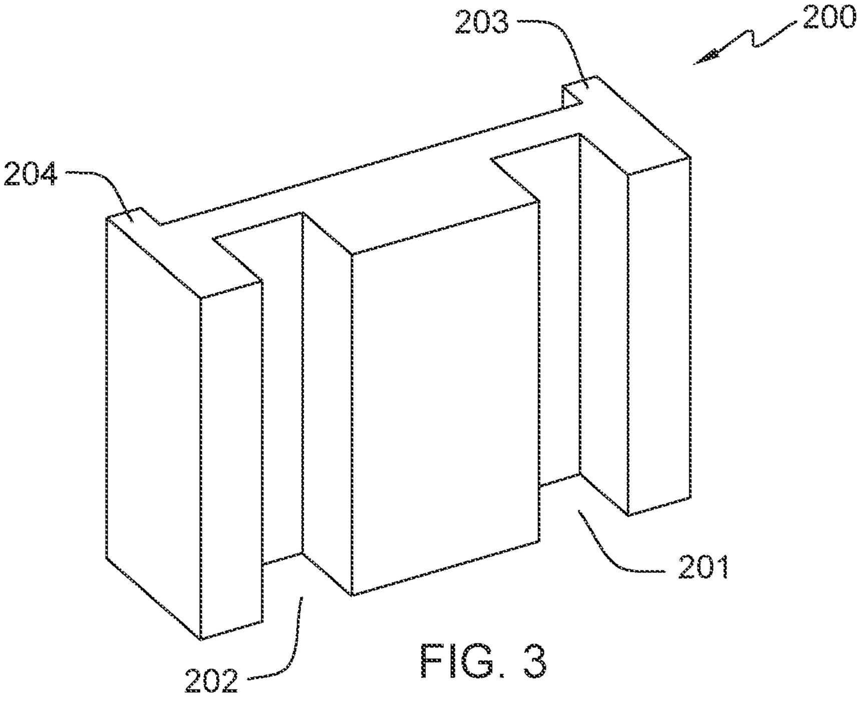
FIG. 3 depicts an isometric view of an upper bracket, in accordance with one embodiment of the present invention.
Figure 4:
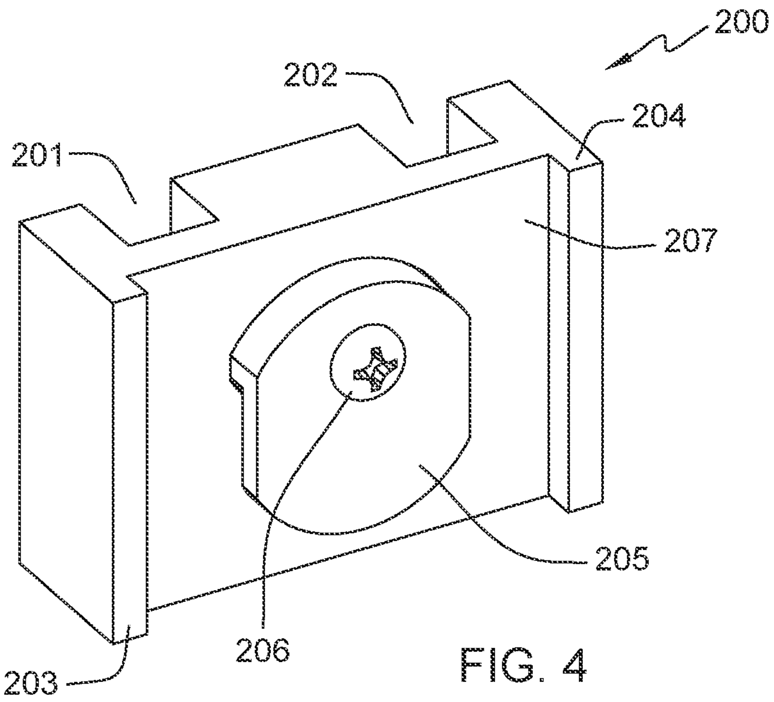
FIG. 4 depicts an isometric view of the upper bracket, in accordance with one embodiment of the present invention.

FIGS. 3 and 4 depicts an isometric view of an upper bracket 200, in accordance with one embodiment of the present invention. The upper bracket 200 may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like. The upper bracket 200 is a solid member with slots 201 and 202 which extend a predetermined distance through the solid member to form two slots that do extend all the way through the upper bracket 200. On an opposing side of the upper bracket 200 are two extrusions 203 and 204 which form a surface 207. The extrusions are used to align the upper bracket 200 with the frame so that the upper bracket 200 is substantially parallel to the frame. This surface is wider than most of the manufacturers frame members to provide for the universal fit of the upper bracket 200. Positioned on the surface 207 and between slots 201 and 202 is an opening which is designed to receive a fastener 206. This opening may be threaded, or the like based on the type of fastener 206 used. Locking member 205 is secured to the surface 207 via the fastener 206. The locking member 205 is designed to work with the specific manufacturers frame to secure the upper bracket 200 to the frame. Given that various manufactures may use different sized openings or the like to secure items to their frames, the locking member 205 is removable and replaceable to allow for a secure attachment to a variety of frames.

Figure 5:
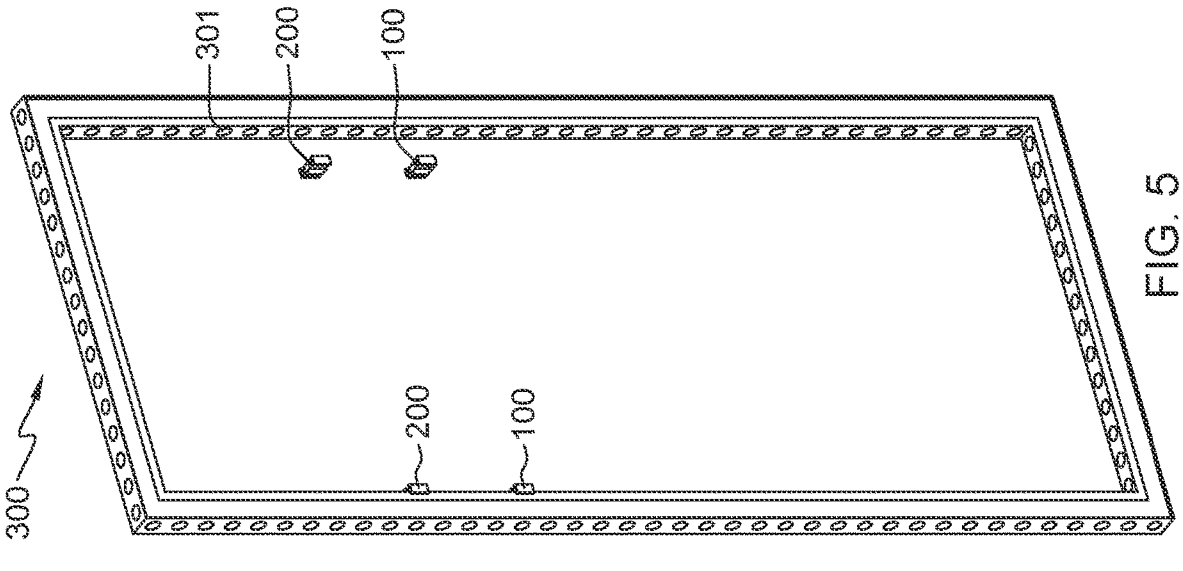
FIG. 5 depicts an assembly view of the installation of the brackets and a panel, in accordance with one embodiment of the present invention.
Figure 6:
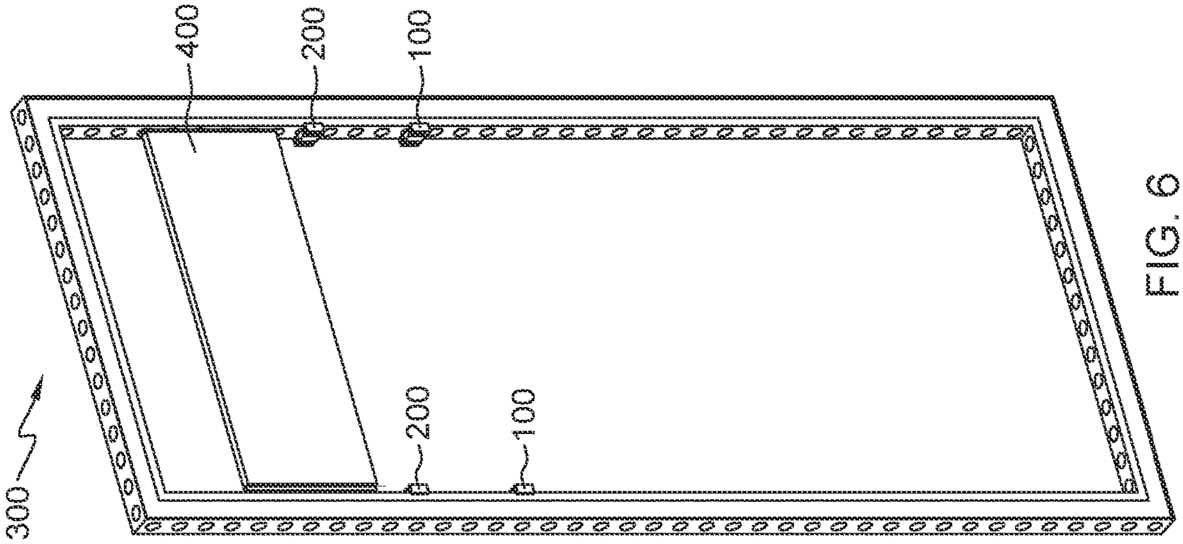
FIG. 6 depicts an assembly view of the installation of the brackets and a panel, in accordance with one embodiment of the present invention.
Figure 7:
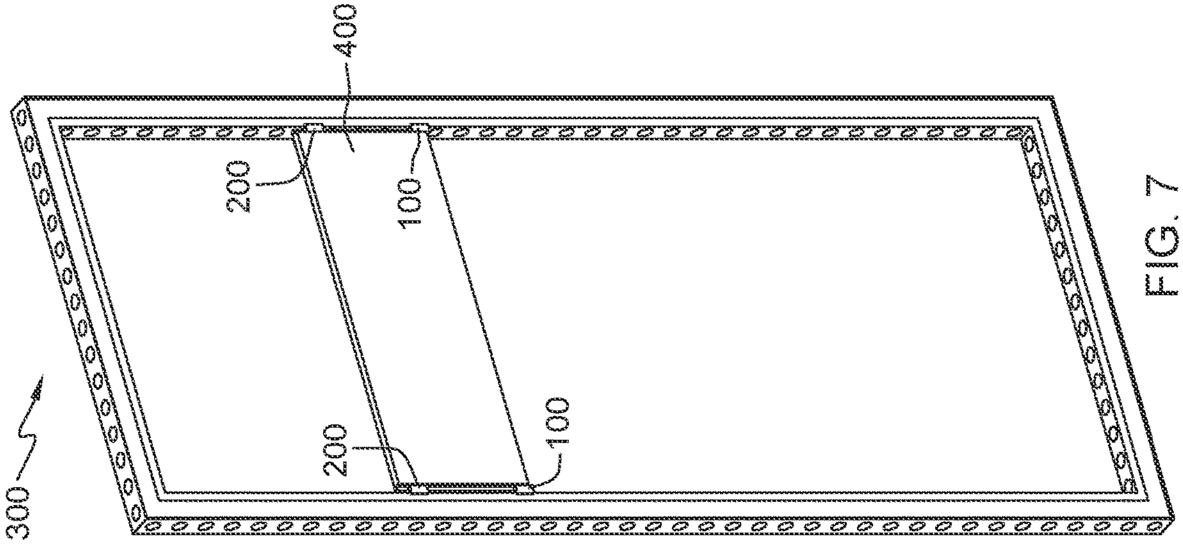
FIG. 7 depicts an assembly view of the installation of the brackets and a panel, in accordance with one embodiment of the present invention.

FIGS. 5, 6, and 7 depicts an assembly view of the installation of the brackets and a panel, in accordance with one embodiment of the present invention. Shown in the installation figures is frame 300. Frame 300 may have a variety of shapes and sizes and is shown here in one design for exemplary purposes. Frame 300 has a series of openings 301 along an interior surface of the frame 300. The end brackets 100 and the upper brackets 200 are shown with a locking mechanism (106 and 205 respectively) to properly interact with the openings 301 of the frame 300. The brackets 100 and 200 are secured to the frame 300 so that the end brackets 100 are substantially level with the ground or lower surface, and the upper brackets 200 are positioned based on the size of the components 400. In the depicted embodiment, the component 400 is a board which is installed and requires a set of end brackets 100 and one set of upper brackets 200. In various other embodiments, additional upper brackets 200 may be needed based on the size of the component 400. Once the brackets 100 and 200 are installed on the frame 300, the component 400 is inserted through the slots 202 or 201 of the upper bracket 200 and down into slots 101 or 102 of the end bracket 100. The two slots on each bracket allow for a component 400 to be inserted to be seen from both sides of the frame. Based on the similarity in the design of the upper brackets 200 and the end brackets 100, the component 400 is slide through the slots and is secured in place and is aligned properly to encounter little to no resistance when installing. Once installed the component 400 is secured in place but can be easily remove by sliding the component 400 out through the brackets in the same fashion it was installed. This is advantageous because non tools are needed for the installation of the components 400, and only a simple tool is needed for the changing of the fastener and the locking mechanism, based on the fastener type. In some embodiments a tool is not required for the changing of the fastener and locking mechanism.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A frame display installation assembly comprising:

a set of end brackets, wherein the set of end brackets have at least one slot, wherein the slot does not extend through the entire bracket and wherein the set of end brackets has a set of extrusions along an exterior edge, and a surface is formed between the set of protrusions; and a set of upper brackets, wherein the set of upper brackets has at least one slot, wherein the slot does extend through the entire bracket and wherein the set of upper brackets has a set of extrusions along an exterior edge, and a surface is formed between the set of protrusions;

a locking plate secured to the set of end brackets and the set of upper brackets by a fastener;

wherein the set of end brackets are connected to a frame and the set of upper brackets are connected to the frame positioned above the set of end brackets.

2. The frame display installation assembly of claim 1, wherein the set of end brackets has an opening on the surface and is sized to receive a fastener.

3. The frame display installation assembly of claim 2, wherein a locking mechanism is attached to the fastener.

4. The frame display installation assembly of claim 1, wherein the set of upper brackets has an opening on the surface and is sized to receive a fastener.

5. The frame display installation assembly of claim 4, wherein a locking mechanism is attached to the fastener.

6. The frame display installation assembly of claim 4, wherein when the set of end brackets and the set of upper brackets are installed on the frame, the at least one slot of the end brackets and the at least one slot of the upper bracket align.

7. A frame display installation assembly comprising:

a set of end brackets, wherein the end brackets have a slot on a first side, wherein the slot extends through a portion of the bracket; and a set of upper brackets, wherein the upper bracket has a slot that ends through the bracket on a first side;

a locking place secured to a second side of the upper brackets and a second side of the end bracket, wherein the locking place is secured with a fastener;

wherein the set of end brackets and the set of upper frame brackets are secured to a frame and wherein the slots of the set of end brackets and the set of upper frame brackets align.

8. The frame display installation assembly of claim 7, wherein the fastener of the set of end brackets and the set of upper brackets is removable.

9. The frame display installation assembly of claim 7, wherein the set of upper brackets have a set of protrusions on the second side.

10. The frame display installation assembly of claim 7, wherein the set of end brackets have a set of protrusions on the second side.

11. The frame display installation assembly of claim 7, wherein the set of upper brackets and the set of end brackets have a set of protrusions on the second side.

12. The display installation assembly of claim 7, wherein the locking place has an extension that forms a slot to interface with the frame.

13. The display installation assembly of claim 1, wherein the locking place has an extension that forms a slot to interface with the frame.

* * * * *